United States Patent [19]

Essop et al.

[11] Patent Number: 5,380,417
[45] Date of Patent: Jan. 10, 1995

[54] SEPARATION ACCELERATOR

[76] Inventors: Saleam Essop, P.O. Box 1638, Hillcrest 3650, South Africa; Allen Bullard, P.O. Box 1638, Hillcrest 3650, South Africa

[21] Appl. No.: 11,880

[22] Filed: Feb. 1, 1993

[30] Foreign Application Priority Data

Jan. 31, 1992 [EP] European Pat. Off. ........ 92830040.9

[51] Int. Cl.⁶ .............................. B03D 1/00; C02F 1/46
[52] U.S. Cl. .................................... 204/269; 204/149; 204/270; 204/275; 204/278; 204/302
[58] Field of Search .............. 204/302, 304, 305, 306, 204/307, 308, 149, 269, 270, 275, 278

[56] References Cited

U.S. PATENT DOCUMENTS

| | | | |
|---|---|---|---|
| 2,823,181 | 2/1958 | Packie et al. | 204/302 |
| 3,429,809 | 2/1969 | Dotts, Jr. | 210/44 |
| 3,673,065 | 6/1972 | Anderson | 204/149 |
| 3,793,178 | 2/1974 | Austin et al. | 204/272 |
| 3,822,204 | 7/1974 | Sako et al. | 210/44 |
| 3,914,164 | 10/1975 | Clark | 204/149 |
| 3,933,654 | 1/1976 | Middlebeek | 210/521 |
| 3,959,131 | 5/1976 | Ramirez et al. | 210/44 |
| 3,969,203 | 7/1976 | Ramirez | 210/149 |
| 3,969,216 | 7/1976 | Barrett | 204/286 |
| 3,975,269 | 8/1976 | Ramirez | 210/44 |
| 4,012,319 | 3/1977 | Ramirez | 210/44 |
| 4,042,512 | 8/1977 | McCarthey et al. | 210/519 |
| 4,115,279 | 9/1978 | Toft | 210/521 |
| 4,123,336 | 10/1978 | Middlebeek | 210/521 |
| 4,179,347 | 12/1979 | Krause | 204/149 |
| 4,344,845 | 8/1982 | Pielkenrood | 210/199 |
| 4,405,459 | 9/1983 | Smith | 210/521 |
| 4,747,948 | 5/1988 | North | 210/633 |
| 4,915,846 | 4/1990 | Thomas, Jr. et al. | 210/702 |
| 4,919,775 | 4/1990 | Ishigaki | 204/149 |

Primary Examiner—John Niebling
Assistant Examiner—William T. Leader
Attorney, Agent, or Firm—Phelps Dunbar

[57] ABSTRACT

This invention relates to a device for the separation of immiscible liquids of different specific gravities, using gravity. The process of separation is facilitated, and separation quality is improved by using the process of electrolysis within a gravity separator.

11 Claims, 6 Drawing Sheets

SEPARATION ACCELERATOR

BACKGROUND OF THE INVENTION

1. Field of the Invention

This invention relates to devices, generally referred to as gravity separators, designed to separate immiscible liquids of different specific gravities or densities, such as oil and water, and also to devices designed to separate certain contaminating solid particles from liquids.

2. Description of Related Art

Gravity separators utilize gravity for the separation of the immiscible constituents of a liquid mass, i.e. to separate substances of high density from those of lower density. If the substance is liquid, it is common for the liquid of higher density to be referred to as the "carrier liquid" and the liquid of lower density to be referred to as the "surface liquid." The means of delivery of liquid to a separator utilizing gravity may be in the form of pumped-flow or gravity-flow. In either case, the liquid is disturbed to, a great extent and fine particles of the surface liquid are dispersed in the career liquid. This may be caused in part by the agitation of the liquid by the pump or orifice in the flow to the gravity separator.

Upon entry into gravity separators, large globules of surface liquid float quickly to the surface of the carrier liquid and the surface liquid is discharged through outlets provided, usually above the level of the carrier liquid, or the surface liquid is allowed to accumulate and is skimmed off the surface by suitable means. The size of a gravity separator depends on various factors, for example: flow rate, liquid temperatures, liquid type, presence of solids, difference in the density between the carrier liquid and the surface liquid and also the presence of any chemicals which may affect the gravitational separation of such liquids. Further design features may take into account the rising velocity of a discrete particle of surface liquid, which may be contained within the carrier liquid mass. The rising velocity of a discrete particle is directly dependent upon me difference between the specific gravities of the carrier liquid and the surface liquid, together with the size of the discrete particle, which is usually expressed in microns. Owing to the fact that minute particles dispersed within a carrier liquid rise at low rates, separators usually have to be of enormous size, often making them largely impractical. The reason for this is that the combined residence time of the liquid mass contained within the separator is far less than the time needed for a discrete particle to rise to the surface of the carrier liquid.

Since the rising velocity is largely proportional to the size of the discrete particle, attempts have been made to install within separators various types of plates to coalesce these small particles of the surface liquid into large globules, thereby increasing their rising velocity and insuring that the liquid rises to the surface prior to the discharge of the carrier liquid from the separator. See for example U.S. Pat. No. 4,747,948 to North, and U.S. Pat. No. 4,123,365 to Middelbeek. Such plates increase the surface area upon which coalescing may occur, and reduce the distance which a discrete particle has to rise before being coalesced with other particles contacting a plate. The distance between the plates may vary from a few millimeters to many centimeters.

In many effluent types, however, the size of dispersed surface liquid particles is so small (i.e. the order of 10–20 microns) that their rate of rising can hardly be noticed. These particles are sometimes termed "suspended particles." Effluent may also contain many solid particles which may be rising, suspended, or settling within the carrier liquid, depending upon their density, shape, and size. The separation of such particles is difficult to achieve by ordinary gravity means alone. The use of small bubbles of gas to assist in the separation of small liquid or solid particles is also known in the art. Bubbles attach themselves to the small particles and speed their ascent to the surface of the carrier liquid. Gas bubbles may be generated by electrolytic means. See for example U.S. Pat. No. 3,429,809 to Dotts, and U.S. Pat. No. 3,969,203 to Ramirez. Problems associated with the use of electrolytically formed bubbles in separation equipment include: 1) The distance between the point at which the bubbles are generated within the liquid mass and the surface of the carrier liquid may be too great. Bubbles traveling over this distance may be unable to carry the attached small particles, resulting in shearing of the particles from the bubble, and a reduced level of separation; 2) Even distribution of gas bubbles throughout the separation chamber may not be accomplished due to the electrode arrangement, resulting in incomplete treatment of the liquid to be separated; and 3) Similarly, even distribution of contaminated liquid through the separation chamber may not be accomplished due to channeling or other flow patterns which avoid the area of the separator flooded with bubbles, resulting in portions of the liquid mass not receiving thorough treatment.

It is the object of this invention to overcome certain of the problems associated with the prior art by providing a gravity separator incorporating an electrolytic plate system. It is a further aim of this invention to provide a gravity separator with a flow pattern that requires all of the liquid to be treated to come into contact with the electrolytically produced bubbles. It is yet another object of this invention to provide means for producing bubbles within a gravity separator which evenly distributes the bubbles throughout the path of flow of the liquid to be treated. It is another object of this invention to provide a gravity separator with an electrolytic plate system that minimizes the amount of premature shearing of bubbles from the particles to be separated. It is another object of this invention to provide an electrolytic plate system for use within existing gravity separators.

SUMMARY OF THE INVENTION

In accordance with the invention, two or more generally parallel plates of different polarities are placed in an inclined position within a gravity separator. The plates are insulated from each other and from the body of the separator. A voltage is applied across the plates, which then serve as electrodes. The process of electrolysis occurs and gas bubbles are generated evenly across each surface of each plate. The plates are positioned in a manner so that the liquid to be treated must enter and travel through the plate arrangement to reach the discharge of the separator.

Liquid to be treated progresses through the gravity separator until it enters the channels formed in between the plates, where it travels in a laminar fashion. The gas bubbles which are generated from the upper surface of each plate attach themselves to small liquid and solid contaminating particles that are present within the liquid mass. The contaminants are hauled upwards by the action of the gas bubbles and become attached to the lower surface of the plate above. Since bubbles are also generated from the lower surface of each plate, the contaminating particles become saturated with gas and move in the direction of the incline of the plates. When reaching the end of the plate, the particles are sufficiently coalesced and attached to gas bubbles to cause a relatively rapid ascent of the coalesced particles to the surface of the carrier liquid. The type of gas generated on the plates differs with the electrolyte type and electrode type. The amount and size of the gas bubbles which are generated may be controlled by regulating the current potential across the electrodes.

As a further feature of the invention, the upper surface of each plate electrode is roughened so as to increase the amount of bubbles formed by increasing the plate surface area. The lower surface of each electrode plate is smooth and polished so as to create a smooth surface along which gas-saturated particles may easily slide and coalesce. Since the phenomena of electroplating is prevalent, the polarity of the electrodes may be reversed periodically.

DETAILED DESCRIPTION OF THE DRAWINGS

Figure 1:
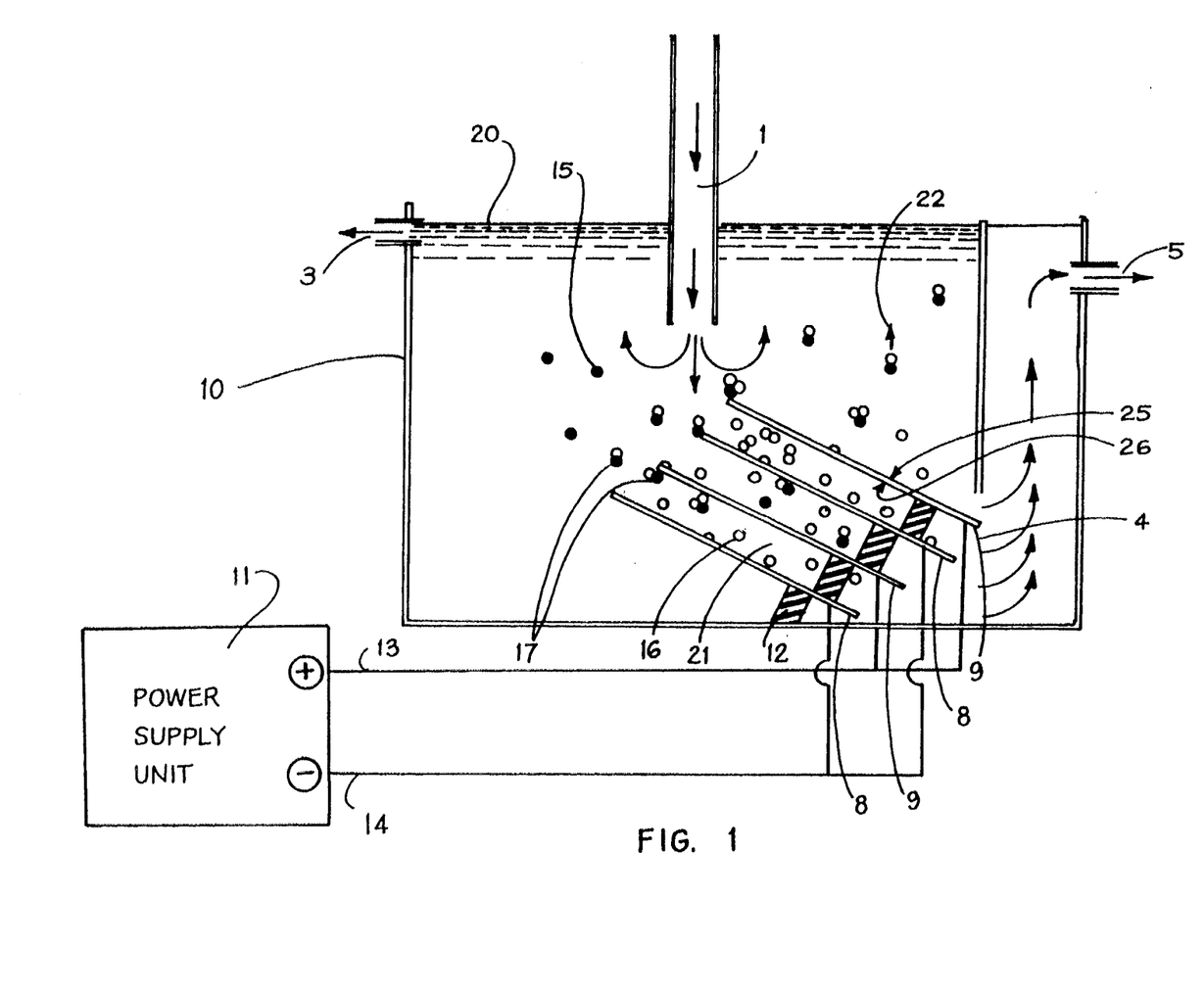
FIG. 1 is a cross sectional view of a gravity separator chamber with electrode plates showing the gas formation and bubble attachment to "suspended particles."

FIG. 1 shows a typical chamber of a gravity separator (10) where carrier and surface liquids, together with suspended particles, enter via inlet (1). When the liquid enters the chamber(10), large globules of the surface liquid rise immediately to the top to form a layer (20) and are discharged via surface liquid outlet (3). Small dispersed "suspended particles" (15) move with the carrier liquid toward communication passage (4) to be discharged via carrier liquid outlet (5).

In accordance with the invention, liquid to be discharged via the liquid outlet (5), first has to pass through the channels (21) formed between the several electrode plates (8) and (9). Before the liquid laden with suspended particles (15) can enter passage (4), gas bubbles (16) attach themselves to the particles and accelerate them upwards as indicated by arrows (22). The bubbles (16) are formed by the process of electrolysis which results from the voltage applied across the electrode plates (8) and (9). The source of the voltage is a power supply unit (11). The electrode plates (8) and (9) are insulated from the body of the gravity separator chamber (10) by insulating material (12). Electrical cables (13) and (14) deliver electricity to electrode plates (9) and (8) respectively. The liquid flow path through the gravity separator chamber (10) is indicated generally by the arrows. The gas bubbles (16) are formed on all surfaces of the electrode plates (8) and (9).

Primary bubbles are generated from upper surfaces (25) of the electrode plates (8) and (9) which carry the suspended particles (15) upward to the lower surface (26) of the electrode plates (8) and (9) where secondary bubbles are generated. These bubbles saturate the suspended particles (15) with gas and carry the saturated suspended particles (17) in the direction of the incline of the electrode plates (8) and (9). Upon reaching the upper end of the electrode plates (8) and (9) the saturated suspended particles (17) rise upwards to join the top layer (20).

The gravity separator chamber (10) may serve as the entire separator unit, or may form but a single chamber of a multi-chamber separator unit. The polarity of the electrode plates (8) and (9) may periodically be reversed to limit the effect of electroplating. Numerous electrode plates (8) and (9) may be used in a chamber (10), and may be aligned to totally or partially block the communication passage (4) such that some or all of the carrier liquid must pass through channels (21) between electrode plates (8) and (9).

The size and number of gas bubbles (16) may be adjusted by altering the voltage potential across the electrode plates (8) and (9). The incline of the electrode plates and (9) may also be adjusted to increase or decrease the time which suspended particles (15) and saturated suspended particles (17) have to coalesce on the lower surface (26) of the electrode plates (8) and (9). Increasing the incline of the electrode plates (8) and (9) will reduce the time available for coalescing, but will increase the rate of upward movement of such particles.

Figure 2:
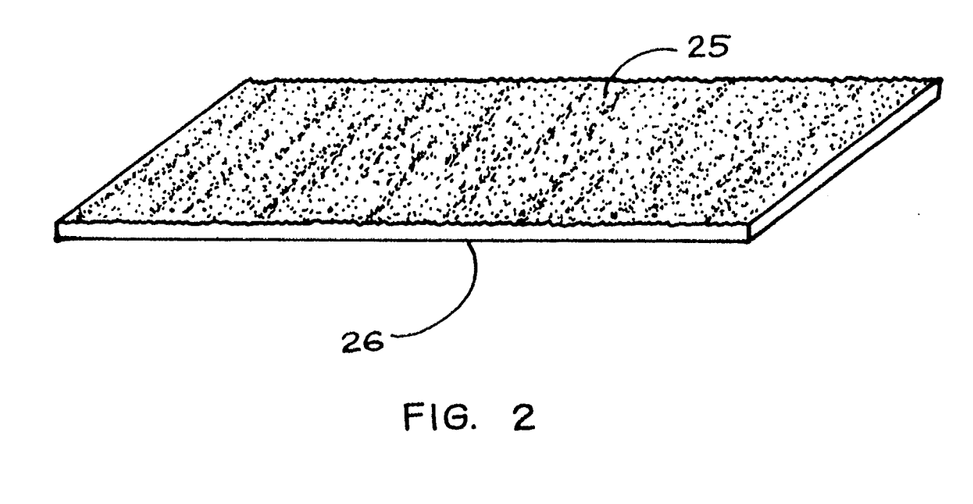
FIG. 2 is a perspective view of a single electrode plate.

FIG. 2 is a view of a single electrode plate indicating the upper surface (25) and the lower surface (26). The upper surface (25) is roughened to increase the surface area available for electrolysis. This increases the number of gas bubbles (16) generated on the upper surface (25) of the electrode plate (8) and (9). The lower surface (26) is smooth, to facilitate movement and coalescence of suspended particles (15) and saturated suspended particles (17) across the lower surface (26) of the electrode plates (8) and (9).

Figure 3:
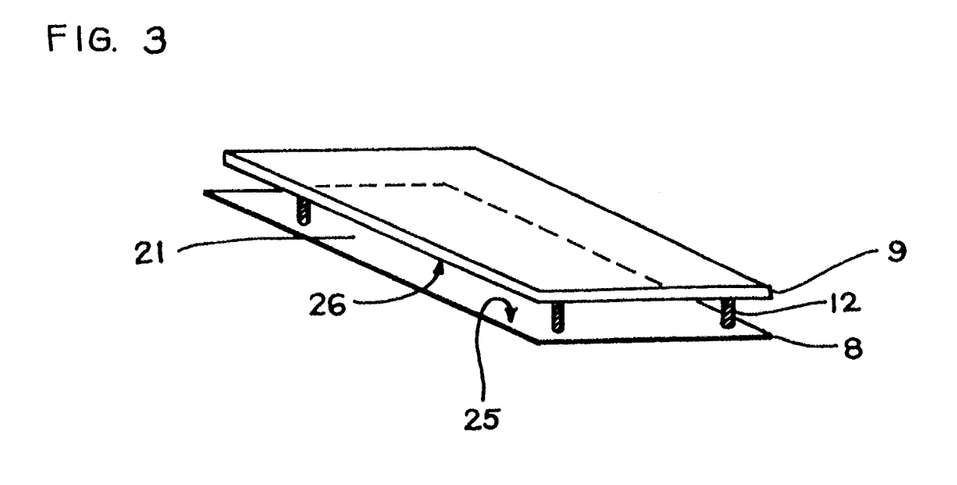
FIG. 3 is a perspective view of an electrode plate formation.

FIG. 3 is a view of a pair of connected electrode plates defining the liquid channel (21) and the upper surface (25) of the electrode plate (8) which is the primary bubble forming surface and the lower surface (26) of the electrode plate (9) which is the secondary bubble forming surface, together with insulating strips (12). As many electrode plates (8) and (9) as is desired may be connected and used within the chamber (10). The distance between electrode plates (8) and (9) (the height of the channel (21), may vary from a few millimeters to many centimeters. The smaller the distance the greater the risk of fouling of the separator, but the easier for small particles (15) to reach the lower surface (26) of the electrode plate (8) or (9) above. Increasing the distance between electrode plates (8) and (9) reduces the risk of fouling but also increases the distance to be traveled by suspended particles (15). A formation of two or more electrode plates (8) and (9) may be utilized in existing separators to enhance their separation capabilities.

Figure 4:
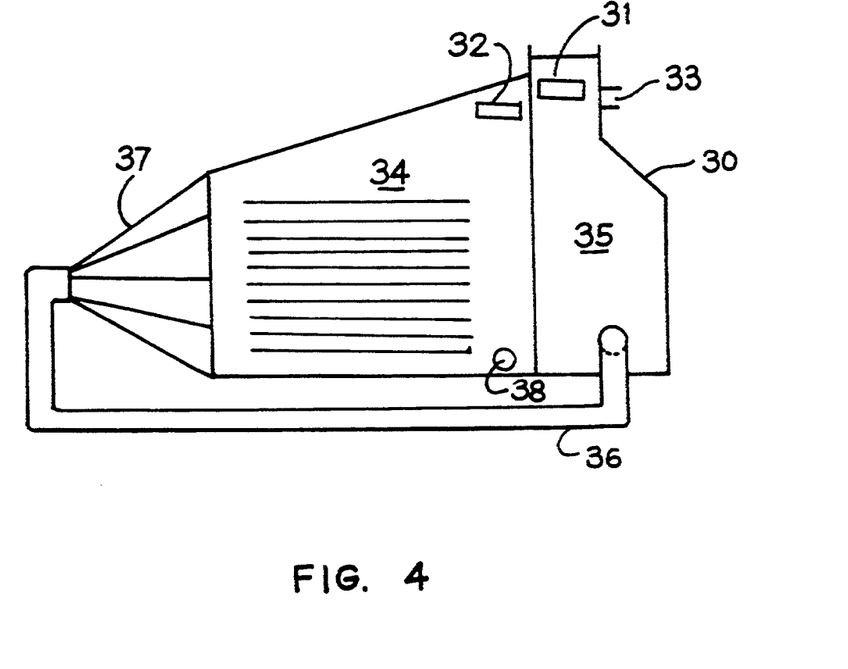
FIG. 4 is a side view of a multi-chamber gravity separator unit with electrode plates.
Figure 5:
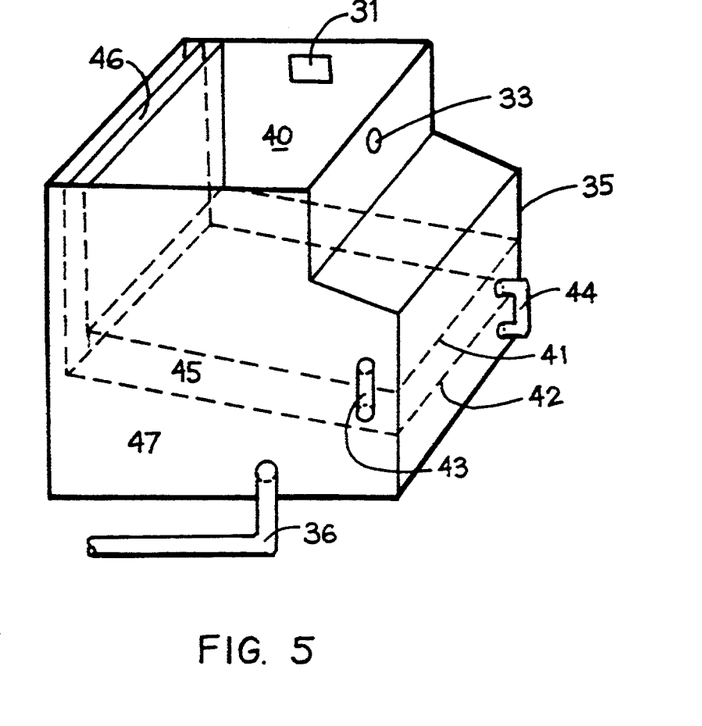
FIG. 5 is a perspective view of one chamber of a multi-chamber gravity separator unit.

FIG. 4 is a side view of a multi-chamber gravity separation unit (30), which utilizes a formation of electrode plates (34) in one chamber. The liquid to be treated enters the separation unit (30) through the inlet conduit (33), and flows into the primary chamber (35). As is best seen in FIG. 5 the primary chamber contains one or more trays of which two are shown (41) and (42). The liquid to be treated enters the upper portion (40) of the primary chamber (35) which is provided with upper portion exit means such as an overflow weir (31). Primary separation takes place in the upper portion (40) of the primary chamber (35). Large globules of surface liquid rapidly rise to the surface of the carrier liquid and exit the primary chamber (35) through the overflow weir (31). The height of the overflow weir (31) may be adjustable to control the rate of removal of surface liquid. The remaining liquid to be treated, now containing a reduced amount of dispersed surface liquid, then exits the upper portion (40) of the primary chamber (35) through conduit (43), and enters a series of chambers (45) defined by one or more trays of which two are shown (41) and (42). There may be as many trays (41) and (42) as is desired. The trays (41) and (42) are inclined to facilitate movement of particles of surface liquid in the direction of the incline. Coalescence of particles occurs on the lower surface of trays (41) and (42). The surface liquid flows along the lower surface of trays (41) and (42) and ultimately reaches the vertical portion (46) of the area defined by the trays (41) and (42). The liquid travels up the vertical portion (46) and exits the chamber (35) via another adjustable overflow weir (not shown). The areas defined by the trays (41) and (42) are connected by conduits (43) and (44). These conduits are arranged such that the carrier liquid must travel through the space defined by the trays (41) and (42).

After traveling through the last of the series of trays (41) and (42) in the primary chamber (35) the carrier liquid, now containing a further reduced amount of dispersed surface liquid, exits the primary chamber (35) via conduit (36) and is fed into the electrolytic plate chamber (34) (see FIG. 4). Means are provided to evenly distribute the carrier liquid into the electrode plates. This is accomplished in FIG. 4 by the use of concentric cones (37) through which the carrier liquid passes. The electrode plates (8) and (9) are best shown in FIG. 1. As many as are desired may be placed in the electrolytic plate chamber (34). The plates are inclined such that saturated suspended particles (17) of surface liquid are directed to the outlet means located in the electrolytic chamber (34). Such exit means may be an adjustable overflow weir (32). The carrier liquid, now effectively cleansed of surface liquid, exits the electrolytic chamber (34) and the gravity separator(30) by outlet (38). Although not shown in FIG. 4, additional chambers may be incorporated into the Gravity separator after the electrolytic chamber (34) to allow for further separation of surface liquid, if desired. However, use of the upper portion (40) and lower portions (45) and (47) of the primary chamber (35), in conjunction with the electrolytic plate chamber (34) removes virtually all of the economically removable surface liquid from the carrier liquid.

Figure 6:
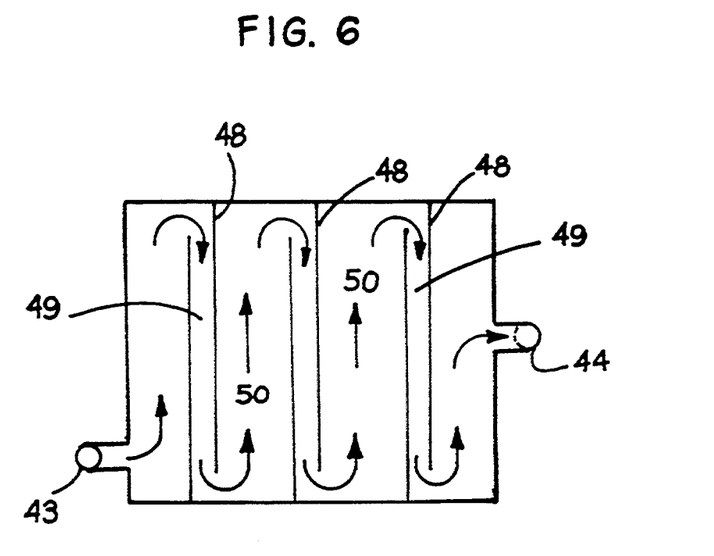
FIG. 6 is a view of a tray in a chamber of a multi-chamber gravity separator unit.
Figure 7:
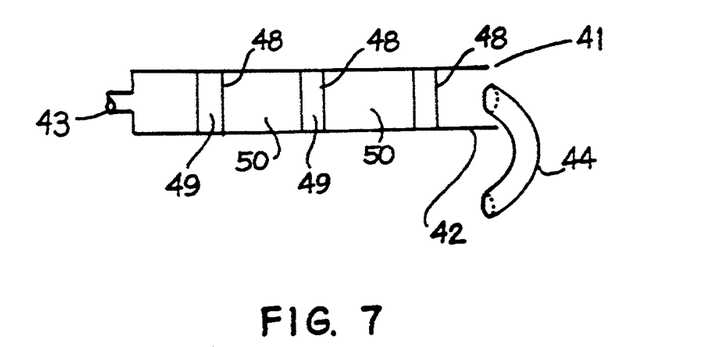
FIG. 7 is a cross-sectional view of a tray in a chamber of a multi-chamber gravity separator unit.

FIG. 6 shows a detail view of the trays (41) and (42) in the primary chamber (35). The trays are provided with dividers (48) which cream tray channels (49) and (50). The dividers (48) extend from the tray above to the tray below, as shown in FIG. 7. The space in between trays (41) and (42) is divided into tray channels of two differing sizes (49) and (50). These tray channels (49) and (50) should be designed such that the wider channels (50) accommodate fluid traveling up the incline and the narrower channels (49) accommodate fluid traveling down the incline. In this manner the fluid traveling up the incline flows at a reduced velocity than when it flows down or against the incline. This allows greater time for rising particles of surface liquid to reach the lower surface of a tray while the liquid is flowing up the incline.

The electrolytic plates (8) and (9) may be provided with a similar channeling system as that mentioned for the tray system in the primary chamber (35). The dividers (48) in any electrode plate system must not allow a direct path for current to flow from one plate to the next.

What we claim is:

1. A gravity separator for separating surface liquid from carrier liquid comprising;

a primary chamber comprising upper and lower portions, said upper portion of said primary chamber comprising inlet means for receiving liquid to be treated, outlet means for surface liquid adjacent to the top of said upper portion, and outlet means for partially treated carrier liquid adjacent the bottom of said upper portion of said primary chamber, whereby said partially treated carrier liquid travels to said lower portion of said primary chamber, and wherein said lower portion of said primary chamber is further comprised of two or more inclined trays which define channels connected in series by conduits, said channels formed between inclined trays communicating with an equal number of vertical channels, said vertical channels being provided with outlet means adjacent the top of said vertical channels for said surface liquid, whereby particles of surface liquid rise and coalesce and travel upward along the lower surface of said trays until said particles of surface liquid enter said vertical channels and exit said gravity separator through said outlet means adjacent the top of said vertical channels, said lower portion of said primary chamber further comprising outlet means for partially treated carrier liquid adjacent the bottom of said lower portion;

an electrolytic chamber in communication with the bottom of said lower portion of said primary chamber, said electrolytic chamber comprised of an electrolytic cell which is further comprised of two or more electrodes of opposing polarities constructed in the form of plates which are situated parallel to one another, said electrodes being insulated from one another and being insulated from the body of said gravity separator, inlet means for introducing partially treated carrier liquid into said electrolytic chamber, outlet means adjacent the top of said electrolytic chamber for passage of said surface liquid, and outlet means adjacent the bottom of said electrolytic chamber for passage of said carrier liquid, said electrode plates being located within said electrolytic chamber whereby a portion of said carrier liquid must pass through the channels formed between said electrode plates to reach said outlet means for said carrier liquid, and communication means between said outlet means for partially treated carrier liquid adjacent the bottom of said lower portion and said inlet means for introducing partially treated carrier liquid into said electrolytic chamber, whereby partially treated carrier liquid may exit the bottom of said lower portion of said primary chamber and enter said electrolytic chamber.

2. A gravity separator for separating surface liquid from carrier liquid according to claim 1, wherein said parallel electrode plates are not vertically oriented, such that each of said parallel electrode plates has an upper and lower surface, and further wherein said upper surface of one or more of said parallel electrode plates is roughened to increase the surface area of said upper surface of said parallel electrode plates for increased gas bubble formation.

3. A gravity separator for separating surface liquid from carrier liquid according to claim 1 wherein said parallel electrode plates are not vertically oriented, such that each of said parallel electrode plates has an upper and lower surface, and further wherein said lower surface of one or more of said parallel electrode plates is smooth to allow particles saturated with gas to slide easily along said lower smooth surface of said electrode plates.

4. A gravity separator for separating surface liquid from carrier liquid according to claim 1 further comprising means for reversing the polarity of said electrodes to prevent electroplating and subsequent sacrifice of the positive electrodes.

5. A gravity separator for separating surface liquid from carrier liquid according to claim 1 further comprising means for controlling the current potential across said electrode plates whereby the size and number of gas bubbles generated by said electrodes can be regulated.

6. A gravity separator for separating surface liquid from carrier liquid according to claim 1 wherein said electrode plates are inclined to facilitate the ascent of gas saturated particles.

7. A gravity separator for separating surface liquid from career liquid according to claim 1 wherein said electrode plates are located within said electrolytic chamber whereby all of said carrier liquid must pass through the channels formed between said electrode plates to reach said outlet means for said carrier liquid.

8. A gravity separator for separating surface liquid from carrier liquid according to claim 1 wherein said inclined trays in said lower portion of stud primary chamber are provided with a plurality of dividers whereby said channels formed between said trays are divided into a plurality of smaller channels whereby said carrier liquid must travel a back and forth path within the space between two of said trays.

9. A gravity separator for separating surface liquid from carrier liquid according to claim 8, wherein said smaller channels are of two dimensions, the smaller dimensioned channel conveying carrier liquid down or against the incline said trays and the larger dimensioned channel conveying carrier liquid up or with the incline of said trays.

10. A gravity separator for separating surface liquid from carrier liquid according to claim 1, wherein said outlet means for surface liquid are comprised of adjustable weirs, whereby the level of surface liquid in said gravity separator may be adjusted.

11. A gravity separator for separating surface liquid from carrier liquid according to claim 1, wherein said partially treated carrier liquid is evenly distributed into said electrolytic chamber using a plurality of concentric cones adjacent said inlet means for introducing partially treated carrier liquid into said electrolytic chamber.

* * * * *